Nov. 25, 1947.     L. F. CARTER     2,431,304
GYRO COMPASS INSTRUMENT
Filed Sept. 29, 1943     2 Sheets-Sheet 1

INVENTOR
LESLIE F. CARTER
BY
*Herbert H. Thompson*
HIS ATTORNEY

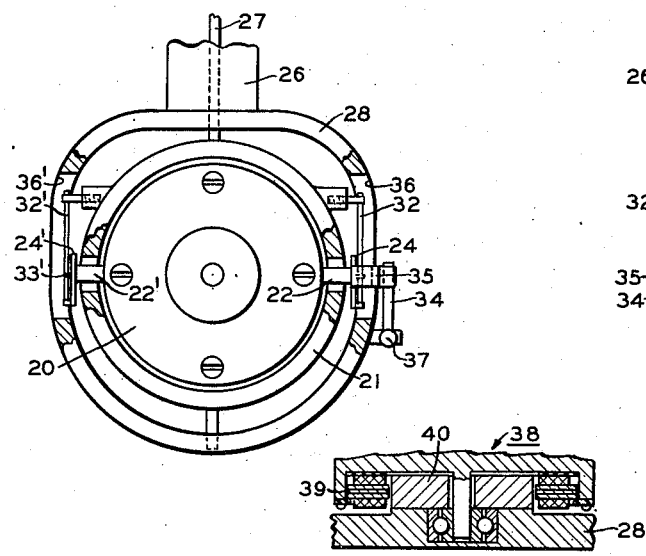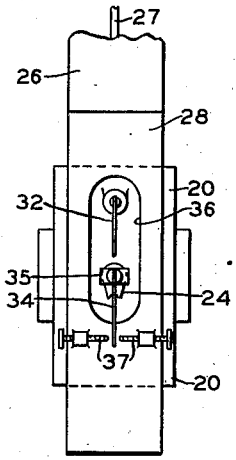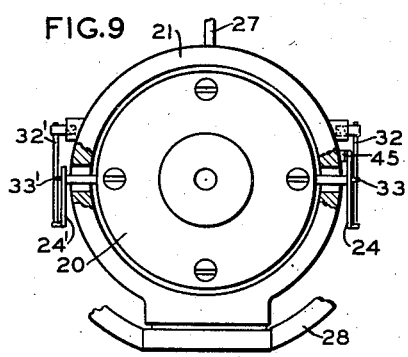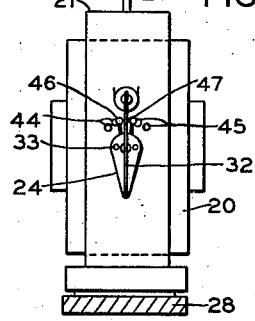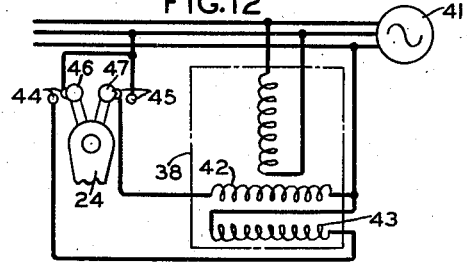

Patented Nov. 25, 1947

2,431,304

UNITED STATES PATENT OFFICE 2,431,304

GYRO COMPASS INSTRUMENT

Leslie F. Carter, Leonia, N. J., assignor to Sperry Gyroscope Company, Inc., a corporation of New York Application September 29, 1943, Serial No. 504,241

12 Claims. (Cl. 33—226)

This invention relates to gyro compasses and more particularly pertains to a mounting for the rotor case of such an instrument by which a controlling torque is obtained.

One of the principal sources of error in the present type of gyro compasses is due to friction about the horizontal axis of support of the rotor bearing case. These bearings are at least two in number and in certain types of compasses of greater number and are subject to static friction due to the fact that the relative tilt of the case and vertical ring under normal conditions is very small, so that very little motion takes place within the bearing. One of the objects of the invention is to reduce this friction by taking the weight of the rotor and its case off the horizontal bearings by means such as a flexible tape or leaf spring suspension.

A feature of the invention is in so constructing the flexible tape or leaf spring suspension that supports the case that the normal gravitational or meridian-seeking torque exerted upon tilt of the gyro is retained. This may be accomplished by connecting the flexible support above or below, that is, eccentrically of the tilt axis and center of gravity of the gyro case, so that upon relative tilt of the case and vertical ring to which the flexible tape is secured, a relative lateral displacement of the center of gravity of the case and its pivotal point of support takes place.

A further object of the invention consists in the reduction of so-called quadrantal error due to rolling and pitching of the ship by limiting the maximum acceleration torques exerted on the gyroscope. This may be readily accomplished by my novel type of suspension by providing stops to limit the relative displacement of the center of gravity of the gyro casing and apparent point of support.

Still a further feature of the invention resides in the provision of spring means effective upon tilt of the rotor case from a normal position to exert a torque about the vertical axis of the instrument and thus damp the movements of the same.

Other objects, features and structural details of the invention will be apparent from the following description when read in relation to the accompanying drawings, wherein:

Fig. 5 is a view similar to Fig. 1 showing a modified form of the invention.

Fig. 8 is an end elevation of the instrument shown in Fig. 5.

Fig. 9 is a side elevation illustrating another modification of the invention.

Fig. 10 is an end elevation of the modification shown in Fig. 9.

Fig. 11 is a detail vertical cross section showing the damping torque motor employed in this form of the invention.

Fig. 12 is a circuit diagram utilized on the form of the invention shown in Figs. 9, 10 and 11.

In the gyro compass shown in Figs. 1 to 4, inclusive, the gyro rotor case is indicated at 20. The rotor (not shown) is mounted within the case 20 and spins about a normally horizontal axis that is perpendicular to the plane of the paper as viewed in Fig. 1. The rotor case is mounted in a vertical ring 21 by means of vertical displaceable or floating bearing means provided in the present instance by trunnions 22, 22' that are guided in but not supported by vertical slots 23, 23' in the ring 21. The trunnion axis defines and constitutes the horizontal tilt axis of the rotor case and is constructed so as to preserve the lateral and longitudinal position of the rotor case in the vertical ring. In accordance with the teaching of the invention, the weight of the rotor case and rotor is not carried by the floating bearings at the tilt axis of the case in the ring, the vertical slots acting only as guides.

Figure 1:
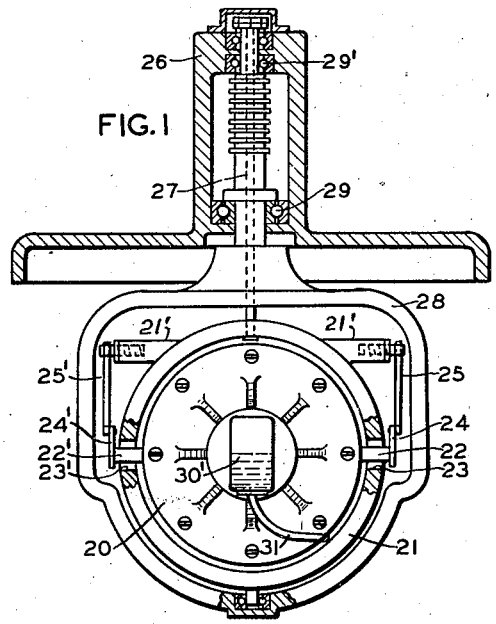
Fig. 1 is a side elevation of a gyro compass constructed in accordance with the present invention.
Figure 2:
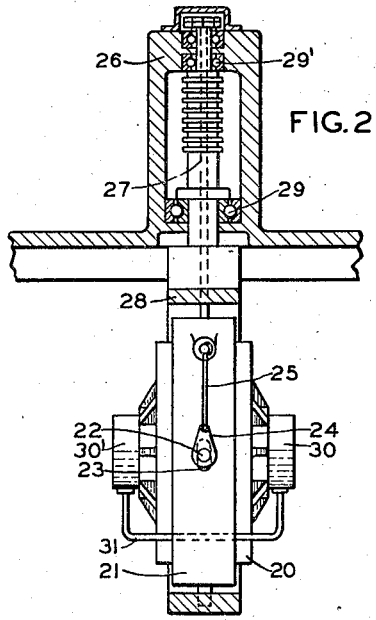
Fig. 2 is an end elevation view of the instrument shown in Fig. 1.
Figure 3:
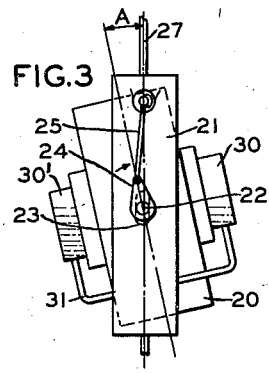
Fig. 3 is a detail view similar to Fig. 2 showing the rotor case in a tilted position.

Substantially the entire weight of the rotor case 20 of the improved gyro compass is supported on the vertical ring by means of a pendent linkage that is connected to the case eccentrically of the tilt axis thereof. As shown in Figs. 1 to 3, inclusive, the rotor case 20 has two parallel crank arms 24, 24' fixed thereto. The crank arms extend radially of the tilt axis of the case and in this instance are fixed to the ends of the respective trunnions 22, 22' which project through the bearing defining vertical slots in the ring 21. The pendent supports for the case in this instance are leaf springs 25, 25' that connect laterally projecting brackets 21' on the ring 21 and the respective crank arms. It will be understood that anti-friction bearings (not shown) are preferably placed between trunnions 22 and 22' and slots 23 and 23'. Flexible tapes, wires or leaf springs 25, 25' depend from the ring in parallel relation and the eccentric connection of the same with the crank arms supports the entire weight of the rotor case and the rotor therein. The ends of the springs 25, 25' are respectively anchored in a suitable manner to the ring and the crank arms.

Ring 21 is carried by the frame 26 through means such as a vertical wire suspension 27 of conventional construction which defines the axis of the ring 21. The phantom or follow up ring of the instrument is indicated at 28, this ring being mounted to turn about an axis coincident with the axis of the vertical ring 21, such axis being defined by bearings 29, 29'. The follow up motor and the controller therefor, which causes ring 28 to remain aligned with ring 21 are well known in the art and are not shown.

A conventional type of damping means is employed in the instrument shown in Figs. 1 to 3, inclusive, which is provided by liquid reservoirs 30, 30' mounted on the rotor case 20 that are connected by a flow restricting pipe connection 31.

The improved mounting of the rotor case 20 in the vertical ring 21 is effective upon earth induced tilt of the case from a normal position (see Fig. 3) to permit a component of the combined weight of the gyro and case to exert a gravity torque about the tilt axis which causes the gyro and vertical ring to precess about its vertical axis and thus provide the gyro compass with its north seeking properties. With the crank arms positioned vertically upward as shown in Figs. 1 to 3, inclusive, that is with the eccentric connection to the gyroscope situated above the axis of the case, the direction of rotor spin of the gyro compass is earthwise. It will be understood that in the form of the invention shown in Figs. 6 and 7, in which this connection is made below the tilt axis of the case, the direction of rotor spin of the gyro compass is counter-earthwise.

The angle noted at A in Fig. 3 is the tilt angle of the rotor case from a vertical position resulting from earth rotation, this angle being exaggerated in the drawing for purposes of clarity, but it ordinarily does not exceed one degree tilt during maximum rate of compass orientation towards the meridian.

Figure 4:
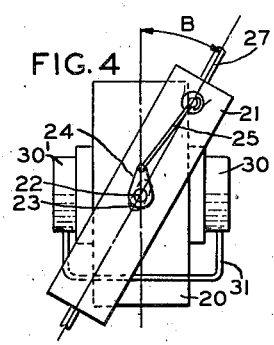
Fig. 4 is a view similar to Fig. 3 showing the vertical ring in a tilted position.

Fig. 4 shows the gyro case in its normal horizontal position and the vertical ring appreciably inclined to the vertical, a condition reached when the compass system swings in its gimbals as a result of a violent roll. It is recognized that this form of compass should employ complete stabilization (not shown) to avoid quadrantal error which would otherwise result from the unrestrained crank arm torque during large angular displacement of the vertical ring when rolling on an intercardinal heading.

However, this form of compass without complete stabilization offers the advantage of constructional simplicity, the performance of which would be fully adequate for service on inland waterways and calm seas, where large roll and pitch movements are not encountered.

In the form of the invention shown in Figs. 5 to 8, inclusive, the supporting linkage for the rotor case is provided by two flexible tapes or leaf springs 32, 32' the ends of which are suitably fixed to the ring 21 and the respective crank arms. The crank arms 24, 24', in this instance, extend below the tilt axis of the rotor case 20. The vertical or Cardan ring construction provides for the floating bearing arrangement of the rotor case thereon as described in detail in connection with the form of the invention shown in Figs. 1 to 3, inclusive. As shown particularly in Fig. 6, tilt of the rotor case through an angle A results in displacement of the cranks 24, 24' and movement of the tapes from a vertical position. The weight of the case 20 is then effective to produce a decentralizing torque about the tilt axis of the case, the direction of the force which is indicated by the arrow in Fig. 6. This torque is similar to the one produced by a conventional mercury ballistic in a gyro compass, the same causing precession of the Cardan ring 21 in the instrument.

Figure 6:
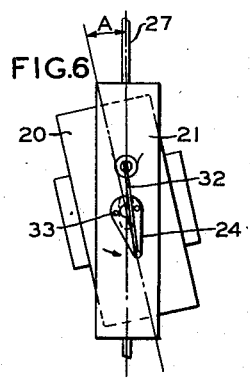
Figs. 6 and 7 are detail views similar to Figs. 3 and 4 of the modified form of the invention in the first of which the case is shown in a tilted position and in the second of which the vertical ring is shown in a tilted position.
Figure 7:
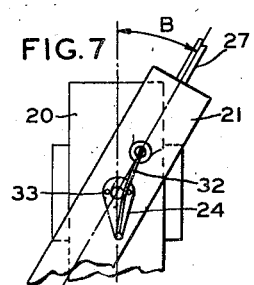

In this form of the invention, the crank arms 24, 24' each have a pair of pins 33, spaced on opposite sides of the axis thereof, the pins serving to engage the tapes 32, 32' and limit the lateral movement of the same. The spacing of the pins is such that for relative tilt of the case and vertical ring due either to the earth's rotation or to turning or change of speed of the ship, as shown in Fig. 6, the tapes do not contact the pins throughout the relatively small tilt angles of the case required to generate horizontal torque for north seeking precession and for precessing the gyro to its proper heading following the effects of course and speed changes. During the much greater displacements of the parts of the instrument due to rolling and pitching as shown in Fig. 7, where the vertical ring may be tilted from the vertical by an angle B, the tapes contact first one and then the other of the pins 33 as shown in this figure. The crank arm torque about the horizontal or tilt axis of the rotor case due to roll accelerations is consequently minimized with a comparable reduction of quadrantal error, and also equalized on the two sides of the swing. In other words, in rough weather the roll of the ship is frequently more violent in one direction than the other due, for instance, to a side wind. This has a particularly bad effect on the ordinary gyro compass because of the unsymmetrical tilting of the vertical ring in the two directions, causing unbalanced disturbing torques. According to my invention, however, the stops limit the displacement to each side of the vertical to a small and equal amount, thus avoiding the building up of an unbalanced disturbing torque in one direction.

The damping means provided in the gyro compass illustrated in Figs. 5 and 8, includes spring means in the form of a leaf spring 34, one of the ends of which is fixed to an extending end of one of the trunnions 22 or 22' extending from the rotor case 20. In this instance, a portion of trunnion 22 that extends beyond the Cardan ring 21 is bifurcated as indicated at 35. Tape 32 extends through the opening provided by the spaced arms of the bifurcated portion of the trunion. As shown, the phantom ring 28 of the gyro compass includes a vertically slotted portion as indicated at 36 and the trunnion 22 projects through the slot in the phantom ring. The spring 34 extends radially of the trunnion 22, on which it is fixed, the same moving with tilt of the case about its axis from a normally ineffective position to an effective position. When the gyroscope becomes tilted, the free end of spring 34 contacts a motion limiting means situated on the phantom ring in the form of two spaced adjustable screws 37. Contact of the spring 34 with the limiting means results in damping the gyroscope, because it causes the follow up motor to do work on the gyroscope in reducing the tilt.

A modified form of damping means for the improved gyro compass is illustrated in Figs. 9 to 12, inclusive. As shown, a torque motor generally indicated at 38, Fig. 11, is employed to exert the required torque about the axis of the vertical ring 21. Motor 38 may be of the polyphase induction type and the wound stator 39 thereof may be suitably affixed to the vertical ring as shown in Fig. 11. The rotor 40 of the motor 38 is fixed in position on the phantom ring 23. Motor 38 constitutes a normally ineffective electrical means for exerting a torque about the axis of the ring. The motor is included in a selective circuit as shown in Fig. 12, one of the windings being continuously energized through suitable leads to an alternating current source 41. The control windings of the motor as designated at 42, 43 are controlled by switching means in the circuit operated by the crank 24 of the linkage to render the electrical means or motor effective. The switching means provided, in the present instance, includes two pairs of spaced contacts 44 and 45 located on the vertical ring which normally break the circuit to the respective windings 43 and 42. A bridging connection is provided for each of the spaced contact pairs as noted at 46 and 47, which connections are mounted on the crank arm 24. It will be understood that when the crank arm 24 tilts, one or the other of the bridging connections 46, 47 will bridge the space between either spaced contacts 44 or 45, and complete the circuit from the source 41 through either control winding 42 or 43 of the torque motor 38 to thereby apply a damping torque about the vertical axis of the gyroscope, which reduces the tilt.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro compass having a vertical ring and rotor bearing case, bearing means for pivotally mounting said case in said ring for tilting about a horizontal axis spaced vertically from the center of gravity of said case, including a pendent linkage pivotally supporting substantially the entire weight of the case from the ring, said linkage being secured on each side of the ring and case at a point on the ring above said tilt axis and at a point on the case spaced in the same sense from the tilt axis and normally in the same vertical plane therewith, and guide bearings between said ring and case along said tilt axis.

2. A gyro compass as claimed in claim 1, in which the linkage connections to the case are above the tilt axis.

3. A gyro compass as claimed in claim 1, in which the linkage connections to the case are below the tilt axis.

4. A gyro compass as claimed in claim 1, in which the rotor case has two parallel crank arms fixed thereto that extend radially of the tilt axis thereof in the same direction, and the pendent supports for the case are leaf springs that connect the ring and the respective crank arms.

5. In a gyro compass, a vertical ring having vertical slots therein, a rotor case having horizontal trunnions slidable along the slots in the ring, a normally vertical radially disposed crank fixed to each of the trunnions of the case, both cranks extending downwardly below said trunnions, and means for suspending said case on said ring comprising a linkage connecting the ring and the free ends of the cranks, the points of connection of said linkage to said ring and crank normally lying in the same vertical plane as said trunnions.

6. A gyro compass as claimed in claim 5, having stops on each side of said linkage adjacent said trunnion adapted to be engaged by said linkage upon relative tilt of said case and vertical ring exceeding a predetermined amount, whereby the transient gravitational effects on the gyroscope are limited during swinging of the compass.

7. In a gyro compass having a vertical ring and rotor case, bearing means for anti-pendulously mounting said case in said ring for tilting about a horizontal axis, including a flexible connection for pivotally supporting substantially the entire weight of the case from the ring, said connection being secured on each side of the ring and case at a point on the ring above said tilt axis and at a point on the case below the tilt axis in the vertical plane, and stop means for engaging said connecting means upon relative tilt of said case and ring of more than a predetermined amount for reducing roll induced errors.

8. In a gimbal supported gyro compass, means for supporting a rotor case about a horizontal axis with the center of gravity thereof normally lying in the vertical plane containing said horizontal axis but spaced therefrom, whereby lateral displacement of said center of gravity from said plane occurs upon relative tilt of said case and its support, and means for limiting the amount of such lateral displacement to an amount comparable to that caused by the maximum earth induced tilt of the case, whereby excessive or unequal alternating shifts of said center of gravity and said center of support are prevented during swinging of the compass in its gimbal bearings.

9. In a gyro compass having a vertical ring and rotor casing, means for suspending the casing from a horizontal axis within said ring for tilting about a second horizontal axis normally lying in the same vertical plane as the axis of suspension from said ring and as the center of gravity of said casing, said two axes and said center of gravity relatively shifting laterally upon relative tilt of said casing and ring, and stop means for preventing such shift beyond a predetermined amount for reducing roll induced errors.

10. A gyro compass having axially coincident vertical and follow-up rings, a gyro rotor case mounted for pivotal movement about a horizontal axis in said vertical ring, a normally non-active spring arm movable with said case upon tilt thereof about its horizontal axis, means situated on said follow-up ring for limiting the tilting of said arm, the free end thereof upon tilt of the case a predetermined amount from a normal position contacting said limiting means and thereby exerting a damping torque about the vertical axis of the compass.

11. A gyro compass having axially coincident vertical and follow-up rings, said follow-up ring having a vertical slot therein, a gyro rotor case having a horizontal trunnion mounting on a vertical ring, a normally non-active spring arm fixed on an extension of one of the trunnions that projects through the slot in the follow-up ring, and means situated on said follow-up ring for limiting the tilting of said arm, the free end thereof upon tilt of the case a predetermined amount from a normal position contacting said limiting means and thereby exerting a damping torque on said compass.

12. In a gyro compass having a vertical ring and rotor casing, means for suspending the casing from a horizontal axis within said ring for tilting about a second horizontal axis normally lying below and in the same vertical plane as said axis of suspension and as the center of gravity of said casing, said two axes and said center of gravity relatively shifting laterally upon relative tilt of said casing and ring, and electrical means brought into action by such relative shift beyond a predetermined amount for damping the compass.

LESLIE F. CARTER.

REFERENCES CITED

The following references are of record in the file of this patent:

UNITED STATES PATENTS

| Number | Name | Date |
|---|---|---|
| 1,496,087 | Henderson | June 3, 1924 |